(12) United States Patent
Gupta et al.

(10) Patent No.: US 10,013,273 B1
(45) Date of Patent: Jul. 3, 2018

(54) VIRTUAL MACHINE TERMINATION MANAGEMENT

(71) Applicant: AMAZON TECHNOLOGIES, INC., Seattle, WA (US)

(72) Inventors: Diwakar Gupta, Seattle, WA (US); Sean Alexander Monroe, Seattle, WA (US); Vijit Gupta, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 15/189,151

(22) Filed: Jun. 22, 2016

(51) Int. Cl.
*G06F 9/455* (2018.01)

(52) U.S. Cl.
CPC ............. *G06F 9/45558* (2013.01); *G06F 2009/45562* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2008/0189358 A1* | 8/2008 | Charles | G06F 9/4443 709/203 |
| 2012/0136925 A1* | 5/2012 | Horiuchi | G06F 8/20 709/203 |
| 2014/0245294 A1* | 8/2014 | Kaul | G06F 9/45558 718/1 |
| 2014/0282543 A1* | 9/2014 | Ignatchenko | G06F 9/45558 718/1 |
| 2015/0365351 A1* | 12/2015 | Suit | G06F 9/45558 709/226 |
| 2017/0322793 A1* | 11/2017 | Ran | G06F 8/65 |

\* cited by examiner

*Primary Examiner* — Charlie Sun
(74) *Attorney, Agent, or Firm* — Blank Rome LLP

(57) ABSTRACT

A provider network (and associated methods) permits virtual machine instances to be terminated but imposes some checks to reduce the risk that an instance is unintentionally terminated. In one example, a safety stock threshold is imposed for a group of instances. If terminating instances within that group would cause a violation of the safety stock threshold, the provider network requests confirmation for the instances to be terminated. In another example, a time delay is imposed after receipt of an instance termination request before the instance is actually terminated. During the time delay, the instance is transitioned to an idle state but otherwise persists on its host computer thereby allowing time to revoke the instance termination. In yet another example, the provider network obtains independent confirmation of the identities of all instances to be terminated before such instances can be terminated pursuant to a termination request.

20 Claims, 6 Drawing Sheets

VIRTUAL MACHINE TERMINATION MANAGEMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine (e.g., a server) to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

Virtual machines can easily be created and terminated. Some service providers permit their customers to submit requests to create the virtual machines. The service provider's internal systems respond by launching a virtual machine on a physical computer in accordance with the launch requirements specified by the customer. The customer may pay for the virtual machine as long as the virtual machine is needed, and then submit a request to have the virtual machine terminated. Termination of a virtual machine may mean that all data in local memory is lost, internet protocol (IP) addresses may be removed, the guest operating system is erased, etc. Because of relative ease for a customer to terminate a virtual machine, there is also an increased risk of the customer inadvertently terminating a virtual machine. Further, service provider support services are accessible by the customers to create, terminate and otherwise manage their virtual machines. Such support services themselves may be executed on virtual machines. Inadvertently terminating a virtual machine on which a service provider support service is executing may detrimentally impact all customers of the service provider.

BRIEF DESCRIPTION OF THE DRAWINGS

For a detailed description of various examples, reference will now be made to the accompanying drawings in which.

DETAILED DESCRIPTION

Figure 1:
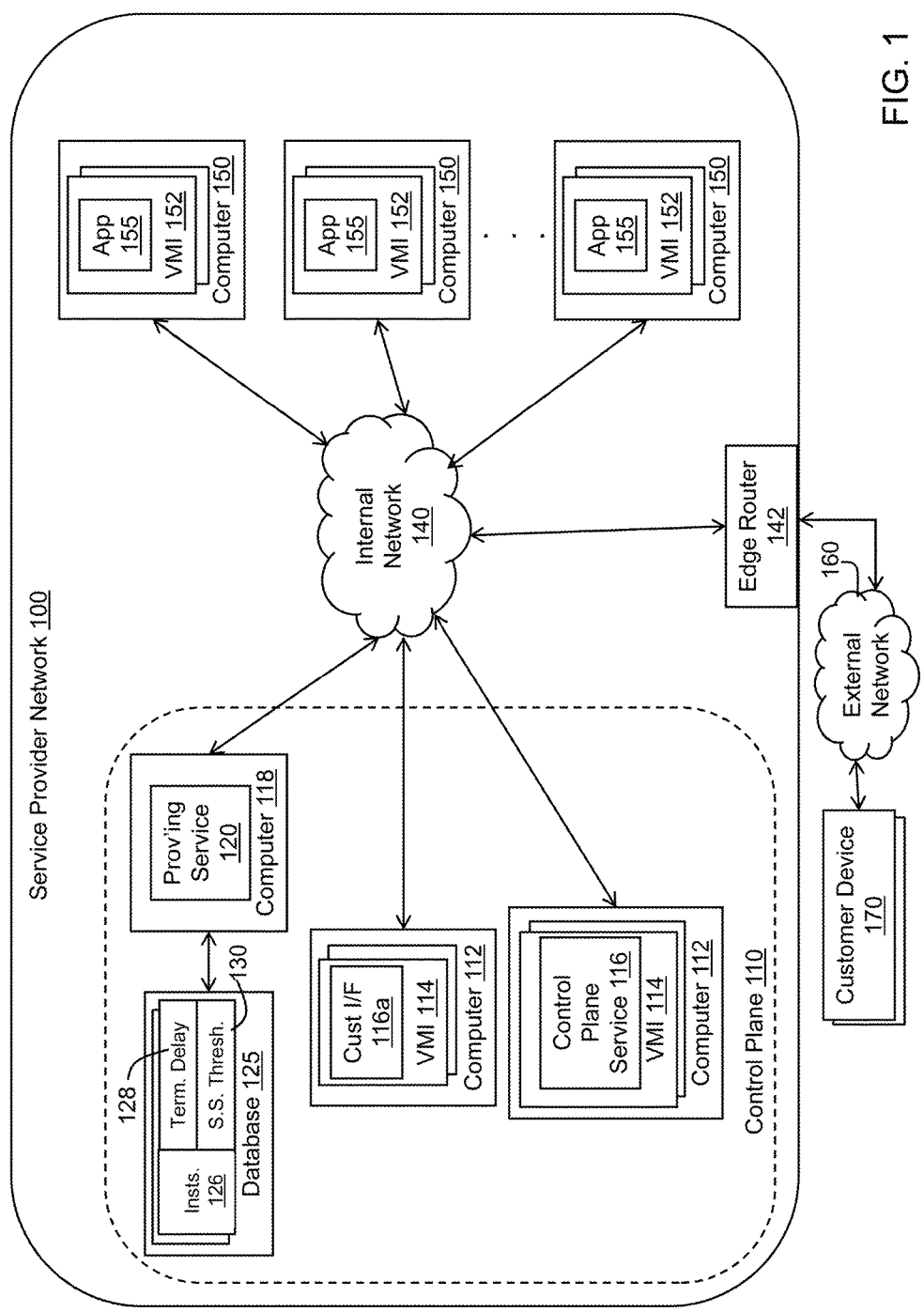
FIG. 1 shows a system in accordance with various examples.

Various techniques are described herein for helping to reduce the risk of inadvertently terminating a virtual machine instance (also referred herein to as a "virtual machine" or an "instance"). The techniques described herein are applicable to instances that are created and managed as part of a public service provider network, but also have applicability to instances that execute on computers in privately-operated networks. Further, the techniques described herein can apply to the termination of instances on which control plane services may execute. References herein to a "user" may mean either an external customer of the service provider network or an internal user/technician of the provider network. The advent of virtualization technology and support services has facilitated users' ability to quickly and easily create new instances and terminate unneeded instances. The support tools which make it possible to readily terminate instances also introduce a risk of unintentional instance termination. Termination of an instance may involve erasing the memory of the physical computer which hosted the instance, removing IP addresses and mappings, erasing the virtual machine itself from the computer, etc. Once an instance is terminated, it can be rebuilt, but the rebuilding process takes time and the data that is lost may not be recoverable.

One of the techniques for reducing the risk of an inadvertent instance termination described herein is to impose a "safety stock" threshold on a group of instances. A customer may have requested the creation of a group of instances. The customer can terminate any of the instances until the number of remaining active instances in the group reaches the safety stock threshold. Once the threshold is reached, any further request to terminate an instance may be refused pending an independent confirmation from the customer to terminate the requested instance. For example, if a customer has 10 active instances and has specified a safety stock threshold of 4 instances, the customer can freely terminate as many as 6 instances. Once the customer tries to terminate a seventh instance, which would reduce the number of active instances below the threshold of 4, the customer will be prompted to confirm that the seventh instance should in fact be terminated, thereby giving the customer an opportunity to determine if the initial termination request was incorrect. If the customer confirms the termination request, the instance then will be terminated despite the number of active instances being below the safety stock threshold. The safety stock threshold may be preset by the service provider or may be programmable by the customer.

Another technique for reducing the risk of an unintentional instance termination is to impose a time delay following receipt of a request to terminate an instance before the instance is terminated. Upon receipt of the instance termination request, the instance may be idled to prevent it from responding to any further requests for service. Once the time delay expires, the instance is then terminated. During the time delay period, a customer can revoke the termination request. The instance remains loaded onto the computer despite being idled, and can be transitioned back to a fully operational state if the customer timely revokes the termination request. The time delay may be configurable by the customer and thus may be whatever value the customer chooses. In some examples, the time delay be 1 minute or greater.

Another technique for reducing the risk of an unintentional instance termination is for the termination process to obtain independent confirmation of the identity of the instances to be terminated. The termination process receives a customer request to terminate one or more instances. The request may include an identifier of each such instance to be terminated. The customer also may provide the identity of each instance to be terminated to a web page accessible by a particular uniform resource locator (URL). Before terminating the instances, the termination process accesses the web page associated with the URL to confirm that the instances to be terminated as identified in the termination request match the identity of the instances returned by the web page mapped to the URL. If an identity of an instance in the request matches the identity returned using the URL, the instance is terminated. Otherwise, an instance whose identity in the request does not match the identity returned using the URL is not terminated. These techniques can be implemented alone or in combination with one another.

FIG. 1 shows an embodiment of a service provider network 100 on which instances can be created, terminated and otherwise managed on behalf of customers of the service provider. In this example, the service provider network may include a control plane 110 coupled to a multiple computers 150 through an internal network 140. Each computer 150 includes one or more processors, memory, network interfaces and other hardware and support software. The computers 150 may comprise, for example, servers housed in racks.

A virtual machine instance 152 is a virtualized computer system, or a software implementation of a physical computer system. Virtual machines may provide for multiple and/or different operating system environments to run concurrently on a single computer 150 having a processor and memory. In one example, multiple virtual machines of a Linux® operating system environment may execute concurrently with multiple instances of a Microsoft® Windows® operating system environment on a single physical computer. A virtual machine may include or interact with a hypervisor or a virtual machine monitor (or other type of virtualization system) which are programs that execute on the physical computer that allow multiple guest operating systems to share a single hardware host. Each operating system appears to have exclusive access to the host's processor, memory, and other resources. However, the hypervisor controls the host processor and resources, allocating what is needed to each instance's operating system in turn and making sure that the guest operating systems of the virtual machines cannot disrupt each other. Each virtual machine is controlled by a respective customer, who has access only to his or her own virtual machines and no access to the virtual machines of other customers, even virtual machines of other customers executing on the same physical computer 150.

Once the customer's instances 152 are created, the customer can load each virtual machine instance with whatever customer-specific applications the customer so chooses. The customer's applications may comprise web server applications, data processing applications, or any other type of back-end functionality that the customer wants to provide to that customer's clients.

The customers can access a control plane 110 to request instances 152 to be created and terminated. The control plane includes various services that may be implemented as applications that execute on computers 112 and 118. A variety of control plane services may be provided by the service provider. Examples of control plane services include a provisioning service (including constituent sub-services) 120 which performs actions such as creating instances, terminating instances, and configuring and reconfiguring the instances. Through the provisioning service 120, a customer can create multiple instances associated with that customer's account. As such, each customer account may be used to create a group of instances and there may be multiple (and typically many) customer accounts. In general, access to one customer account only permits instances to be created and managed under that account, and does not grant the customer management access to the instances under another account. Multiple groups of instances may be created under a single customer account, and a customer may have multiple accounts. A group of instances may be created by applying a common "tag" to a number of instances to form a group. Further, instances can be assigned to placement groups by the user. Further still, all of the instances in a customer account may be considered to be a group.

In some embodiments, a dedicated instance termination service is provided that interacts with other components of the provisioning service 120 to perform the techniques described herein. That is, the provisioning service 120 may perform instance creation, instance reconfiguration, and instance termination, but employ a dedicated subservice to perform the instance termination functionality described herein as attributed to the provisioning service 120.

Other control plane services 116 also may be provided such as a customer interface 116a. The customer interface 116a may receive requests for instance creation, instance termination, etc. from customers via customer devices 170. The customer devices 170 may be computers, smart phones, tablet devices, personal digital assistants, etc. which include a processor, memory, and other hardware, and may execute a web browser to give the customer access to his or her account. The requests may be in the form of application programming interface (API) calls which may be generated through a web page generated by the customer interface 116a and accessible to the customer on a browser executing on the customer device 170, through a script generated by the customer, or via other techniques for generating and submitting APIs to the customer interface 116a. Other types of control plane services 116 may be provided as well.

In some embodiments, one or more of the control plane services execute in instances 114 that are hosted on computers 112, 118. In the example of FIG. 1, control plane services 116, 116a execute within instances 114 hosted on computers 112, while the provisioning service 120 executes on a dedicated computer 118 without a virtual machine instance, although in other embodiments, all of the control plane services including the provisioning service 120 may execute within virtual machine instances.

The control plane 110 also includes a database 125 which is stored, for example, on a hard drive, and which is accessible to the provisioning service 120 either directly or through the internal network 140. The database 125 may be implemented as a single store of information or as multiple discrete stores of information. The information contained in the database includes instance information 126 which may comprise the number and identities of the active instances of a given customer account, or of a particular group of instances within an account. The database 125 also includes a termination delay 128 and a safety stock threshold 130 that are mapped to each such group of instances. Either or both of the termination delay 128 and safety stock threshold 130 may be configurable or may be values that are preset by the service provider. The termination delay 128 and the safety stock threshold 130 may be set through an API call by the customer in advance of launching a group of instances or in the API call itself that requests instances to be launched. The termination delay 128 and the safety stock threshold values can be altered as desired by the customer even after the instances have been launched.

The risk of inadvertently terminating an instance is applicable both to the service provider's customers as well as to the instances in the control plane 110 that run the control plane services. If a customer inadvertently terminates an instance, while the termination may be problem for that customer, the termination generally does not affect other service provider customers. However, if an instance 114 that executes a control plane service is inadvertently terminated, multiple or all customers may be affected as all customers would otherwise have been able to use the control plane service executing on that instance. The inadvertent instance termination techniques described herein are applicable both to the inadvertent termination of control plane instances as well as customer instances.

The safety stock threshold 130 may represent a minimum number of instances that should be maintained for a given customer's group of instances. In the context of a control plane services executing on virtual machine instances, the collection of instances in the control plane 110 may comprise a group to which a safety stock threshold 130 may be configured. In some embodiments, multiple groups of instances may be formed within the control plane 110, and a safety stock threshold may be implemented for each such group. The safety stock threshold 130 may be specified by a customer through an API, a command line interface, etc.

By way of example, if a customer or a service provider agent (responsible for managing the control plane 110) requests 10 instances to be launched, the safety stock threshold may be a number from 0 to 10. In one example, a safety stock threshold of 4 may be specified meaning that at least 4 instances should be active at all times. Instances within the group can be freely terminated, but a safety check is imposed once an instance termination request is received which, if implemented, would cause the number of remaining active instances in the group of instances to drop below 4. In another embodiment, the safety stock threshold may be expressed as a percentage (e.g., 40% in the example above). In yet another embodiment, the safety stock threshold may be expressed as vacancy level. For a launch of 10 instances with at least 4 instances to be active at all times, the vacancy level may be specified as 60%. If 5 instances are terminated and thus 5 instances remain currently active, the group of instances would be 50% vacant. If one more instance were to be terminated, the group would then be 60% vacant. Any more terminations would cause the group to be more than 60% vacant. The vacancy level could be expresses as a number of instances instead of a percentage.

The termination delay 128 is a time period that must elapse after the control plane 110 receives an instance termination request before the targeted instance(s) can be terminated. The termination delay 128 can be any desired value and may be specified in units of seconds, minutes, hours, etc. Each customer can specify a termination delay through a graphical user interface, a command line interface, a script file containing APIs, etc. During the termination delay time period, the instance to be terminated is idled but left loaded on its computer. Once the termination delay time period has elapsed, unless the instance termination request has been revoked (e.g., by a termination revocation API), the termination is terminated.

As noted above, any of multiple techniques for mitigating the risk of an unintentional instance termination may be employed. FIGS. 2-5 provide flow charts with details about such techniques. Each flow chart is discussed below also with reference to FIG. 1. Each flow chart provides multiple operations that may be performed in the order shown, or in a different order. Further, the operations may be performs sequentially, or two or more of the operations may be performed concurrently.

Figure 2:
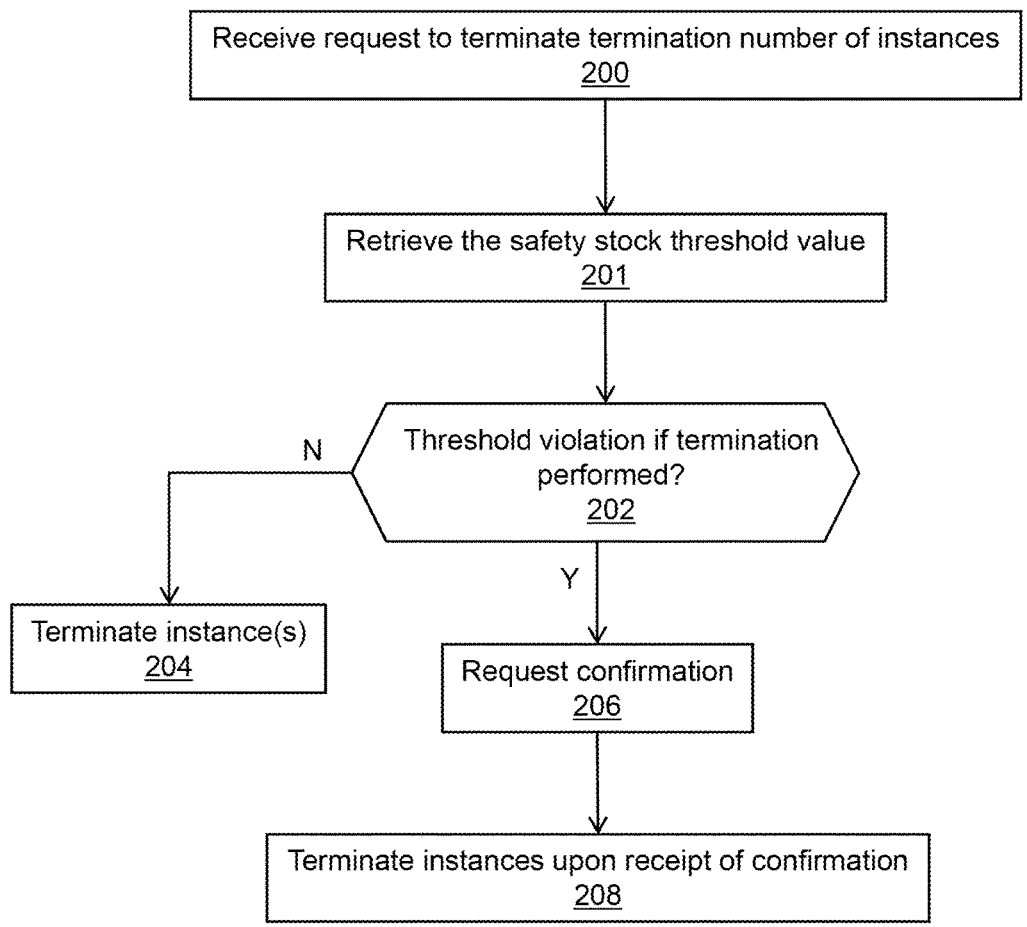
FIG. 2 shows a method for employing a safety stock threshold to reduce the risk of unintentional virtual machine termination in accordance with various examples.

FIG. 2 shows a flow chart which uses the safety stock threshold 130 to reduce the risk of unintentional instance terminations. Although the explanation of FIG. 2 may be given from the vantage point of a customer of the service provider attempting to terminate instances in in a group that has an applicable safety stock threshold, the method is equally applicable to an internal user of the service provider attempting to terminate instances (e.g., instances on which control plane services execute). The method may be performed and/or coordinated by the provisioning service 120 executing on computer 118. A customer previously has specified a safety stock threshold for a group of instances associated with that customer's account. The safety stock threshold may have been specified by a customer through an API call when, for example, launching a group of instances, through a web interface (e.g., graphical user interface), a command line interface, or other input mechanisms. The safety stock threshold may be stored in the database 125 and mapped to the identity of the instances that form the group to which the safety stock threshold applies.

At 200, the method includes receiving an instance termination request (e.g., in the form of an API). The request may specify one or more instances to be terminated, for example, with the specific instance identifiers of the instances desired to be terminated. The customer may issue a termination request API to the provisioning service 120 either through a script, a web interface, a command line interface or other form of input. The request to terminate the instance(s) is received by the provisioning service 120 and acted upon by the termination service 120 as shown in FIG. 2. The number of instances to be terminated per the termination request is referred to as the termination number of instances (e.g., one or more).

At 201, the method includes retrieving the safety stock threshold 130 from the database 125. The retrieved safety stock threshold is the threshold associated with the group of instances to which the instance termination request pertains. The termination request may include a customer account identifier and the identifier can be used as an index into the database to access the record pertaining to that particular customer account. The safety stock threshold is stored in the record mapped to the customer account. Alternatively, the identifier of one or more of the instances in the instance termination request can be used to access the database record containing that identifier and thus to retrieve the corresponding safety stock threshold.

At 202, the method includes determining whether the safety stock threshold would be violated if the instance termination were to be performed. This determination may be implemented by the provisioning system 120 accessing the database 125 to determine the number of actively executing instances in the customer's group of instances to which the termination request applies, and then subtracting the termination number of instances from the number of currently active instances. For example, if there are 8 currently active instances in the customer's instance group, the safety stock threshold is 3, and the customer requests 4 instances of the 8 to be terminated, there will still be 4 instances remaining as active even after the termination is performed, and the safety stock threshold will not be violated. However, if the termination request is for 6 instances to be terminated, then only 2 instances will remain as active, which is below the safety stock threshold of 3. A safety stock threshold violation would occur if 5 instances were to be terminated as requested.

In the case in which no violation would occur if the termination number of instances in the request were to be terminated, then at 204, the instances indicated by the termination request are terminated. The database 125 is updated by the provisioning service 120 to reflect the new number of actively running instances. For example, the identifiers of the terminated instances may be deleted from the database for that customer.

However, if the provisioning service 120 determines that a safety stock threshold violation would occur if the termination number of instances were actually to be terminated, then at 206, the method may include the provisioning service 120 requesting confirmation of the termination request. Any of multiple techniques for obtaining such a confirmation may be employed. For example, the customer may be sent a message (email, text message, internal messaging provided by the service provider network, etc.) to the customer device 170. The message may alert the user that he or she is attempting to terminate a specific number of instances that would cause the number of active instances in the customer's group of instances to fall below the customer-specified safety stock threshold. The message may have a link which can be selected by the user. The link may cause a browser on the customer device 170 to access a specific web page in which the customer can authorize or reject the termination request. If the customer realizes that the number of instances to be terminated is incorrect or that the customer did not intend to terminate any instances, the customer can reject the termination request. Alternatively, if the number of instances to be terminated is correct, then the customer can authorize the termination request and the provisioning service 120 will terminate the termination number of instances upon receipt of the confirmation (208). In other examples, the confirmation request may inform the customer of the potential problem and request the customer to separately access his or her account to confirm the termination request. The customer also can modify the safety stock threshold as desired. For example, the customer can modify the safety stock threshold from 3 down to 2 to permit an instance to be terminated which would otherwise violate the safety stock threshold.

Figure 3:
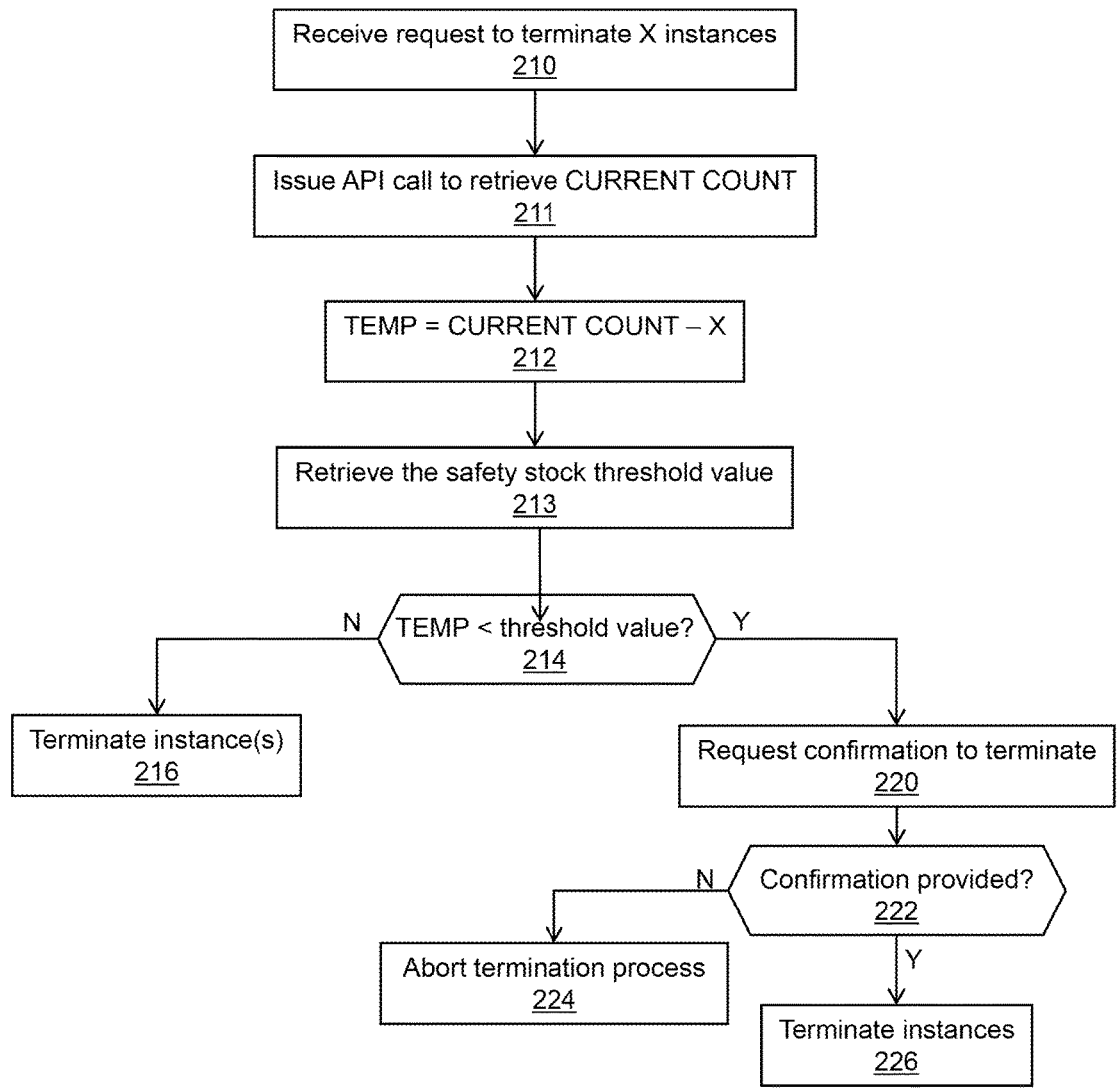
FIG. 3 shows a further implementation of the method of FIG. 2 in accordance with various examples.

FIG. 3 illustrates an implementation of the logic flow of FIG. 2. At 210, a request is received to terminate X instances. The value of X may be an argument in an API request and may be an integer number 1 or greater. At 211, the method includes retrieving the number of currently active instances in the group (CURRENT COUNT). For example, if the customer's group has 8 actively executing instances, the CURRENT COUNT is 8. This operation may be performed through the issuance of an API call as noted above. At 212, a temporary value (TEMP) is computed as the current count of active instances in the customer's group (CURRENT COUNT) minus X. The value of TEMP represents the number of instances that would remain active in the customer's group if the instances specified in the termination requested were to be terminated.

At 213, the method includes retrieving the safety stock threshold 130 from the database 125 as described above. At 214, the value of TEMP is compared to the safety stock threshold. If TEMP is not less than the threshold, then at 216, the instances specified in the termination request are terminated. As a result of terminating instances, the database 125 may be updated to remove the identifiers of the terminated instances and the value of CURRENT COUNT can be determined anew based on the updated identifier list of active instances in the customer's group, and reported out the next time an API is issued for the number of active instances in the group.

At 214, if TEMP is less than the threshold, then at 220, the provisioning service 120 requests confirmation to terminate the instances as described above. If the confirmation is not provided, as determined at 222, then at 224, the termination process is aborted (e.g., the instances are not terminated as otherwise requested). If the confirmation is successfully received at 222, then at 226, the instances are terminated.

Figure 4:
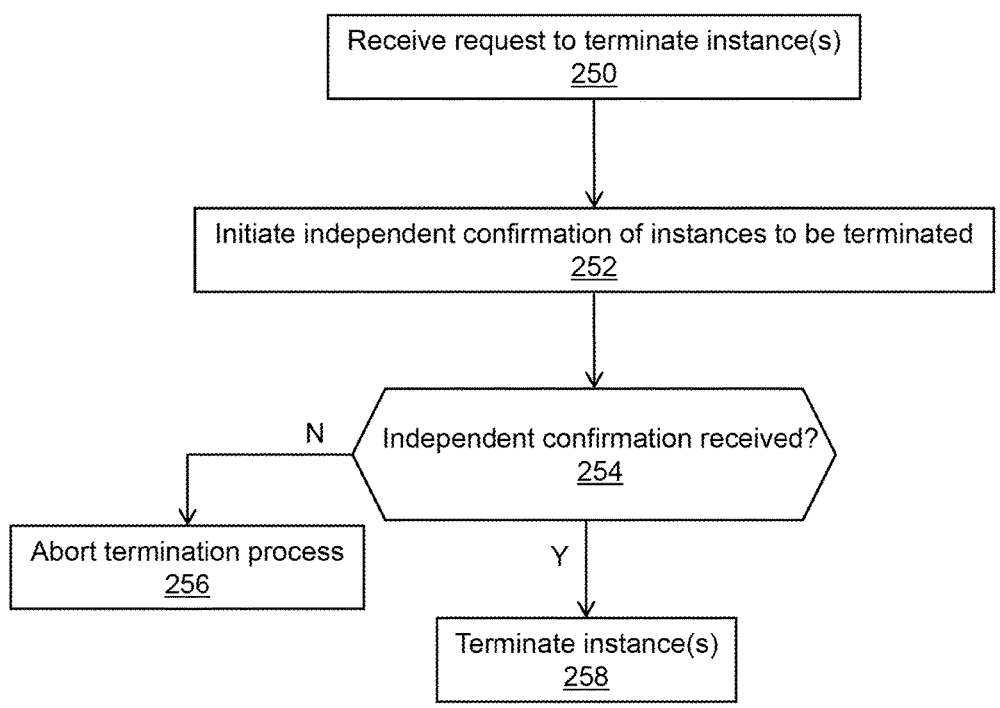
FIG. 4 shows a method for obtaining an independent confirmation before terminating virtual machines to reduce the risk of unintentional virtual machine termination in accordance with various examples.

FIG. 4 shows a method of reducing the risk of an unintentional instance termination by requesting an independent confirmation of each termination request. At 250, the method includes the provisioning service 120 receiving a request to terminate one or more instances. The request may be provided in various ways as described above. At 252, the method includes initiating an independent confirmation of the instance(s) to be terminated. For example, the instances termination request may include identifiers of the specific instances to terminate. The customer may populate a particular resource (e.g., web page) with a list of the instances to be terminated. The instance termination request may include the link to the resource where the separate list of instance identifiers is located.

At 254, the method includes the provisioning service 120 determining whether the independent confirmation was successful. The provisioning service 120 may access the resource and compare the instance identifiers found or returned by the resource to the identifiers in the termination request. If all of the identifiers match, the termination request is confirmed. If the confirmation is not successful, then at 256 the termination process is aborted. Otherwise, at 258, the instances are terminated. If the request is for five instances to be terminated and none of the identifiers for the instances match the identifiers at the resource prepopulated by the customer, then none of the instances are terminated. If some, but not all, of the identifiers from the instance termination request match the identifiers located at the resource, then in some embodiments, only those instances whose identifiers match are terminated, but not the remaining instances. In other embodiments, if the provisioning service 120 is unable to find a match for even one instance identifier from the termination request, then none of the instances are terminated.

Figure 5:
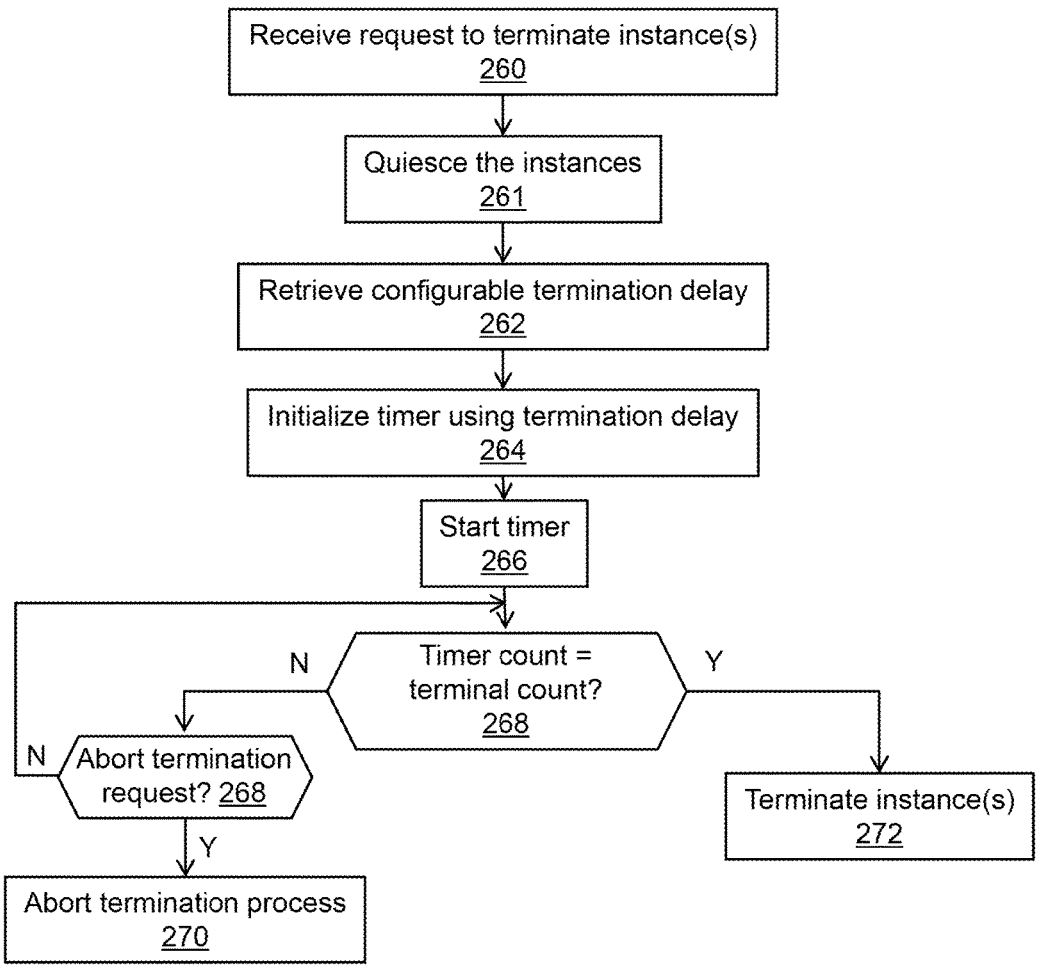
FIG. 5 shows yet another embodiment of a method of reducing the risk of unintentional virtual machine termination through the use of a configurable termination delay in accordance with various examples.

FIG. 5 shows an example of the use of the termination delay 128. At 260, the method includes the provisioning service 120 receiving a request to terminate one or more instances. The request may be provided in various ways as described above. The instance(s) to be terminated are quiesced by the provisioning service 120 at 261. This process may involve disabling network connectivity for the instance, but otherwise allowing the instance to remain loaded on its host computer. Further, the data in the instance's memory may remain in place and not be erased. Different or additional actions may be taken to quiesce the instance.

At 262, the method further includes retrieving the termination delay value from the database corresponding to the group of instances to which the termination request pertains. A timer is then initialized at 264 to count for a period of time equal to or otherwise associated with the termination delay retrieved from the database 125. The timer may be implemented as a counter, which may be a hardware or software-implemented counter. In some embodiments, the counter is a count-up counter which counts up from an initialized value (e.g., 0) to a programmable terminal count value (e.g., the termination delay). In other embodiments, the counter is a count-down counter which counts down from a programmable initial value (e.g., the termination delay) to a terminal count value (e.g., 0). The timer is initialized using the termination delay value at 264 and the timer is triggered to begin counting at 266. When the counter completes its counting process (as determined at 268), then the instances specified by the instance termination request are terminated at 272.

While the timer is counting the termination delay time period, the instance remains present on its host computer but has been transitioned to a quiescent mode as described above. During this mode and while the timer is counting out the termination delay time period, if a customer realizes that the instance(s) should not be terminated (268), there may still be enough time for the customer to "undo" the termination request. At 268, the provisioning service 120 may receive an indication to abort the termination request. The abort indication may be implemented as an API call specifically to abort a previously transmitted instance termination request. The abort termination API call may refer to a specific termination request API by an API identifier. Alternatively, the abort termination API call may not refer to a specific prior termination request API and instead cause any termination request API received by the provisioning service 120 for that customer whose termination delay time period has not yet expired to be aborted (270).

The termination delay may be preset by the service provider or may be configurable by the customer such as through an API call, web page, etc. The termination delay may be set long enough (e.g., one minute or greater) to allow the customer enough time to realize that a mistake was made, that is, that the instance should not be terminated.

Any of the techniques described in FIGS. 2-5 may be implemented in some systems. Further, various combinations of the techniques described above may be performed in combination. For example, the use of the safety stock threshold with the termination delay may be implemented. That is, any time an instance is to be terminated may terminated following the expiration of its termination delay time period (assuming the termination request has not been aborted). Further, the safety stock threshold is checked and if the safety stock threshold were to be violated were the termination request to be honored, then a confirmation is obtained before the instances can be terminated.

Similarly, the use of the independent confirmation for each instance termination can be combined with the termination delay technique. That is, any time an instance is to be terminated, an independent confirmation of the identity of the instance is obtained before the instance can be terminated, and even then only after the expiration of its termination delay time period (assuming the termination request has not been aborted).

Figure 6:
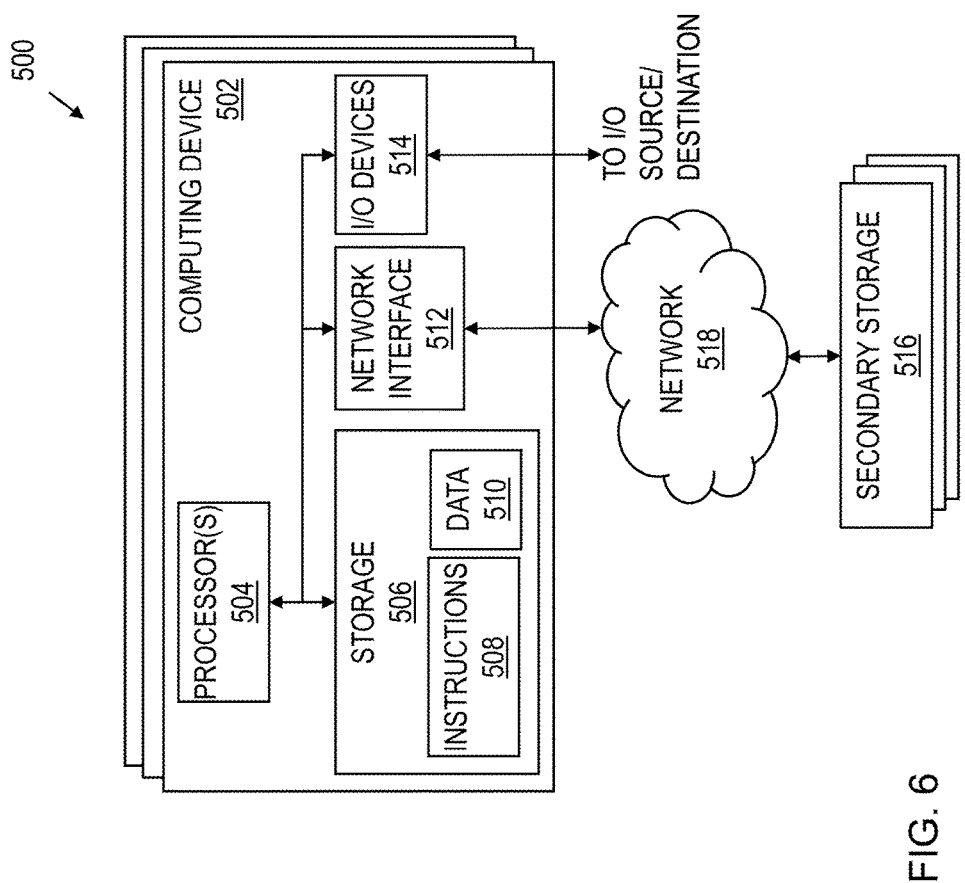
FIG. 6 shows an example of an embodiment for a compute node to implement the various techniques described herein.

FIG. 6 shows a schematic diagram for a computing system 500 suitable for implementation of the service provider network 110, including the functionality of the provisioning service 120 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the provisioning service 120.

Each computing device 502 includes one or more processors 504 coupled to memory 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 110, each of the computing devices 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the provisioning service 120 and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the provisioning service 180 and interface manager 183 and other components described herein may be implemented as a separate computing device 502 executing software to provide the computing node with the functionality described herein. In some embodiments, the provisioning service 120 and other components may be implemented by the same computing node.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks, via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
one or more computing devices, each of the one or more computing devices including one or more processors, the one or more computing devices configured to implement a user interface and a provisioning service, the provisioning service controlling the creation and termination of virtual machine instances in a service provider network and the user interface providing user access to manage the provisioning service;
wherein the user interface is configured to receive a request to terminate a termination number of virtual machine instances executing on one or more servers within the service provider network;
wherein the provisioning service is configured to:
determine that a safety stock threshold number of virtual machine instances indicating the minimum number of virtual machine instances that are to be operating would be violated if the termination number of virtual machine instances were to be terminated;
request an independent confirmation to terminate the termination number of virtual machine instances when the determination is that the safety stock threshold number of virtual machine instances would be violated; and
upon receipt of the independent confirmation, terminate the termination number of virtual machine instances.

2. The system of claim 1, wherein the provisioning service is configured to determine that the safety stock threshold number of virtual machine instances would not be violated and to terminate the requested termination number of virtual machine instances.

3. The system of claim 1, wherein upon receipt of the independent confirmation, the provisioning service is configured to terminate the termination number of virtual machine instances after a customer-configured time delay.

4. The system of claim 1, wherein the request to terminate the termination number of virtual machine instances includes an identifier for each such virtual machine instance, and wherein the provisioning service is configured to determine that the safety stock threshold number of virtual machine instances would not be violated and to obtain independent authorization to terminate the requested termination number of virtual machine instances, wherein the independent authorization includes the identifier of each virtual machine instance to be terminated.

5. A system, comprising:
one or more computing devices, each of the one or more computing devices including one or more processors, the one or more computing devices configured to implement a provisioning service;
wherein the provisioning service is configured to:
receive a request to terminate a number of virtual machine instances executing on one or more server computers within a provider network;
determine that a termination threshold value of virtual machine instances would be violated if the requested number of virtual machine instances to be terminated were actually terminated and, in response to the determination that the termination threshold value of virtual machine instances would be violated, request a confirmation to terminate the requested number of virtual machine instances; and
upon receipt of the confirmation, terminate the termination number of virtual machine instances;
wherein the requested number of virtual machine instances to terminate is one or more.

6. The system of claim 5, wherein the termination threshold value is the minimum number of virtual machine instances that are to remain active unless a confirmation is received to terminate instances below that number.

7. The system of claim 5, wherein for a total number of virtual machine instances to be launched in a launch request, the termination threshold value is a percentage of the total number of virtual machine instances in the launch request.

8. The system of claim 5, wherein the provisioning service is configured to launch virtual machine instances for a customer account into a plurality of groups of virtual machine instances and provide a separate termination threshold value for each group of virtual machine instances.

9. The system of claim 8, wherein the one or more computing devices are configured to implement a user interface configured to receive a different termination threshold value for each group of virtual machine instances.

10. The system of claim 5, wherein the provisioning service is configured to determine that the termination threshold value would not be violated and to terminate the termination number of virtual machine instances.

11. The system of claim 5, wherein upon receipt of the confirmation, the provisioning service is configured to terminate the termination number of virtual machine instances after a programmable time delay.

12. The system of claim 5, wherein the provisioning service is configured to receive a request to terminate the requested number of virtual machine instances, wherein the request includes an identifier for each virtual machine instance to be terminated, and wherein the provisioning service is configured to obtain independent authorization to terminate the requested termination number of virtual machine instances.

13. The system of claim 12, wherein the independent authorization includes the identifier of each virtual machine instance to be terminated.

14. The system of claim 12, wherein the independent authorization includes receipt of a message from each virtual machine instance authorizing each such virtual machine instance to be terminated.

15. A computer-implemented method, comprising:
receiving, by a computer node, a request to terminate a virtual machine instance within a group of instances executing on one or more server computers within a provider network;
transmitting a call to an application programming interface (API) for a current count of an executing number of virtual machine instances in the group;
based on the current count, computing the number of virtual machine instances in the group that would remain executing if the requested number of virtual machine instances were terminated;
responsive to the remaining number of virtual machine instances in the group being less than a threshold value, obtaining, by the computer node, an independent confirmation that the virtual machine instance identified in the request is to be terminated; and
responsive to the independent confirmation, terminating, by the computer node, execution of the virtual machine instance identified in the request.

16. The computer-implemented method of claim 15, further comprising accessing a virtual machine instance identifier provided at a resource location and determining whether the virtual machine instance identifier provided at the resource location matches a virtual machine instance identifier included in the request.

17. The computer-implemented method of claim 16, wherein obtaining the independent confirmation that the virtual machine instance identified in the request is to be terminated comprises determining that the virtual machine instance identifier provided at the resource location matches the virtual machine instance identifier included in the request.

18. The computer-implemented method of claim 16, wherein the request includes identifiers of a plurality of virtual machine instances to be terminated and a plurality of virtual machine instance identifiers are included at the resource location, and wherein the method includes terminating any virtual machine instance identified in the request that matches a virtual machine instance identifier included at the resource location, and not terminating any virtual machine instance identified in the request that does not match a virtual machine instance identifier included at the resource location.

19. The computer-implemented method of claim 15, wherein upon obtaining the confirmation, terminating the virtual machine instance after a configurable time delay.

20. The computer-implemented method of claim 17, wherein the configurable time delay is at least 1 minute.

* * * * *